Patented Dec. 27, 1949

2,492,195

UNITED STATES PATENT OFFICE 2,492,195

3,11-DIKETO-4-BROMO-17(β)-HYDROXY-20,21-DIACETOXYPREGNANE

Lewis H. Sarett, Princeton, N. J., assignor to Merck & Co., Inc., Rahway, N. J., a corporation of New Jersey No Drawing. Original application July 14, 1945, Serial No. 605,194. Divided and this application February 23, 1946, Serial No. 649,767

1 Claim. (Cl. 260—397.4)

This invention is concerned generally with novel chemical compounds of the cyclopentanodimethylpolyhydrophenanthrene series and to processes of preparing same; more particularly it relates to novel compounds useful as intermediates in the synthesis of the adrenal cortical hormone Δ 4,5-3,11,20-triketo-17(β), 21-dihydroxy pregnene. This application is a divisional of copending application Serial No. 605,194 filed July 14, 1945, now abandoned.

This hormone is known to occur naturally in the adrenal cortex; it has the structural formula:

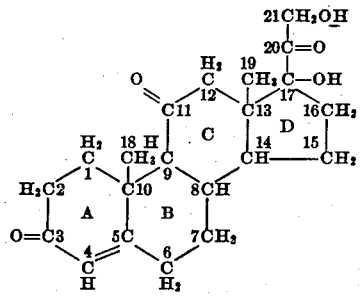

(Standard numbering of C-positions)

This formula, for purposes of convenience, is hereinafter reproduced below in the abbreviated form:

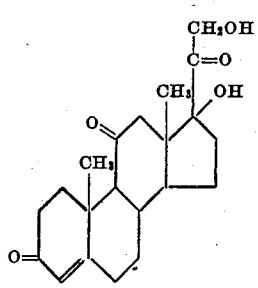

In the following description of the invention, the stereochemical relationship of substituents are indicated by the following conventions:

1. A substituent at the C-3 position which is trans to the C-10 methyl group is parenthetically designated (α).

2. A substituent at the C-17 position, the stereochemical configuration of which is identical with that of the naturally occurring adrenal hormones, is parenthetically designated (β); the epimeric configuration is designated (α). In the structural formulae the former configuration is shown by writing the C-17 substituent (hydroxyl) to the right of the C-17 carbon side chain, thus

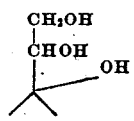

in the latter case above the side chain, thus

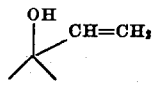

3. The stereochemical relationship of rings A and B is indicated in the formulae by a solid line representing the valence bond in the cis configuration.

In accordance with the present invention it is now found this hormone can be synthesized by reactions indicated as follows:

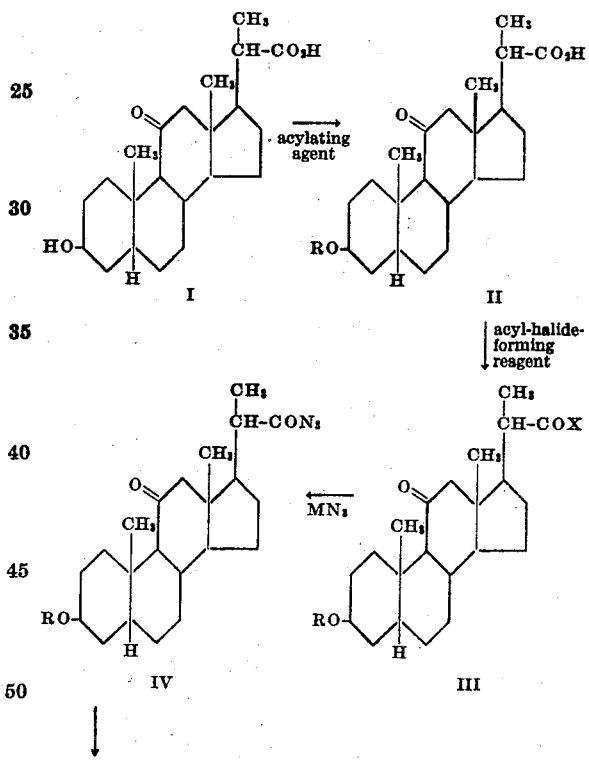

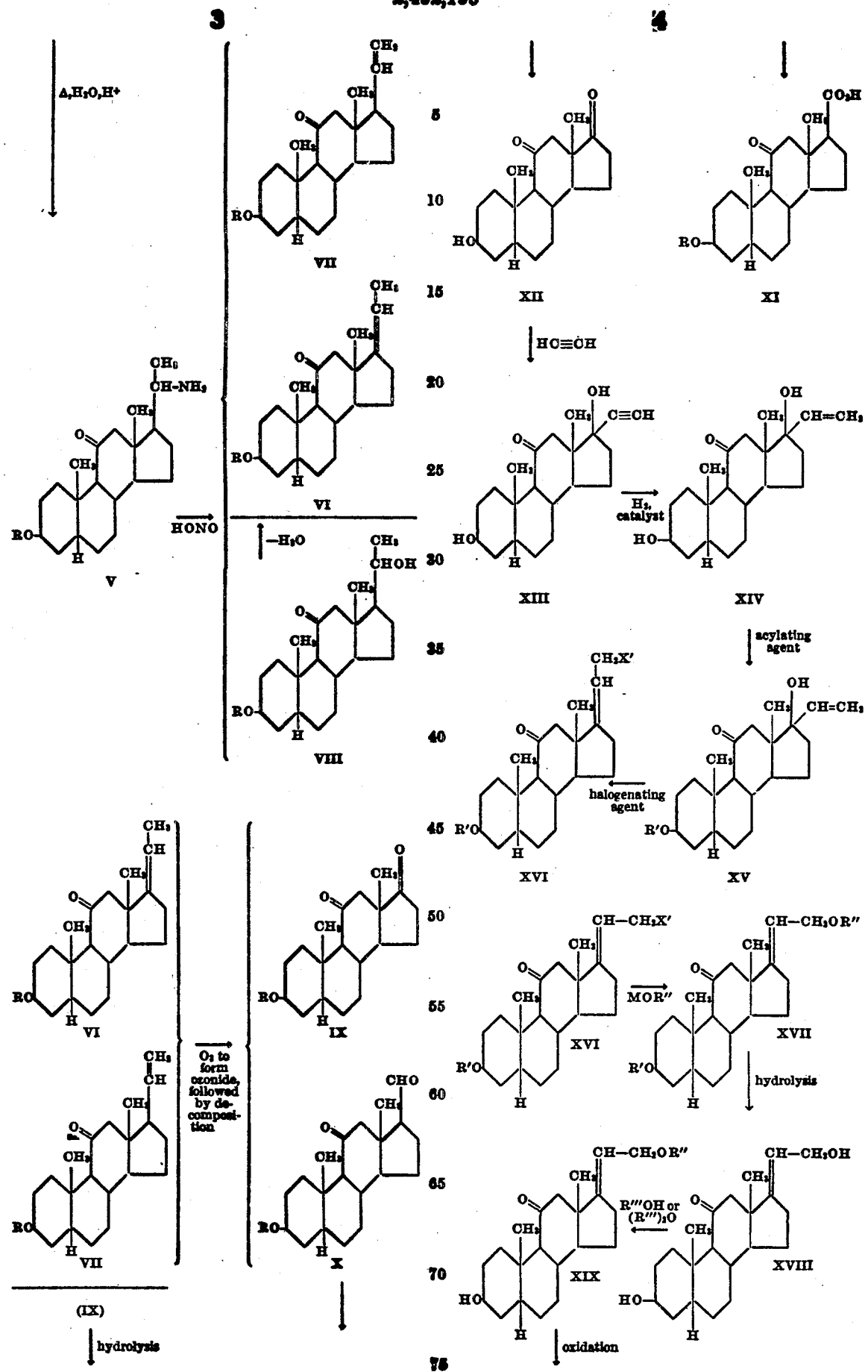

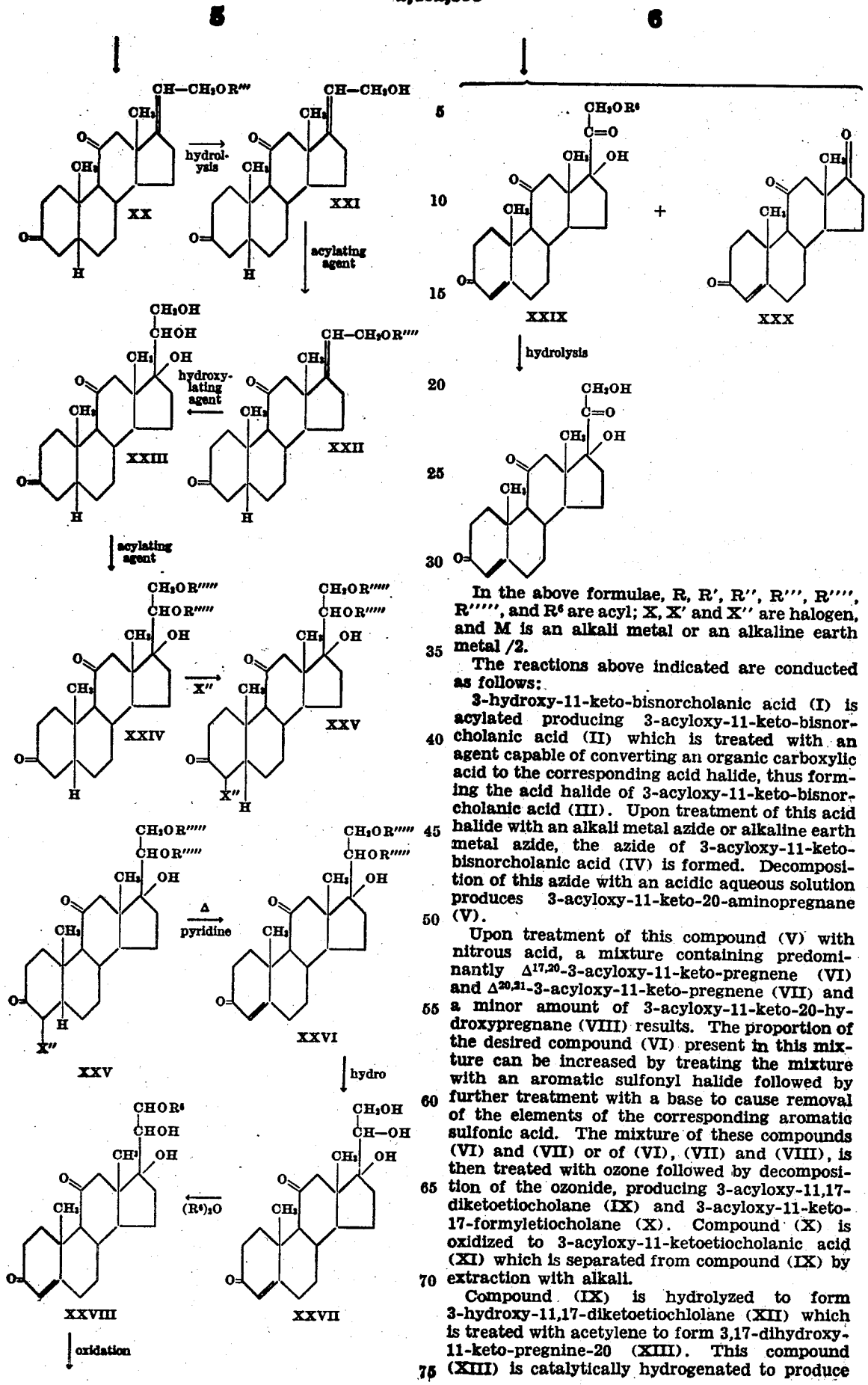

In the above formulae, R, R', R'', R''', R'''', R''''', and R⁶ are acyl; X, X' and X'' are halogen, and M is an alkali metal or an alkaline earth metal /2.

The reactions above indicated are conducted as follows:

3-hydroxy-11-keto-bisnorcholanic acid (I) is acylated producing 3-acyloxy-11-keto-bisnorcholanic acid (II) which is treated with an agent capable of converting an organic carboxylic acid to the corresponding acid halide, thus forming the acid halide of 3-acyloxy-11-keto-bisnorcholanic acid (III). Upon treatment of this acid halide with an alkali metal azide or alkaline earth metal azide, the azide of 3-acyloxy-11-keto-bisnorcholanic acid (IV) is formed. Decomposition of this azide with an acidic aqueous solution produces 3-acyloxy-11-keto-20-aminopregnane (V).

Upon treatment of this compound (V) with nitrous acid, a mixture containing predominantly $\Delta^{17,20}$-3-acyloxy-11-keto-pregnene (VI) and $\Delta^{20,21}$-3-acyloxy-11-keto-pregnene (VII) and a minor amount of 3-acyloxy-11-keto-20-hydroxypregnane (VIII) results. The proportion of the desired compound (VI) present in this mixture can be increased by treating the mixture with an aromatic sulfonyl halide followed by further treatment with a base to cause removal of the elements of the corresponding aromatic sulfonic acid. The mixture of these compounds (VI) and (VII) or of (VI), (VII) and (VIII), is then treated with ozone followed by decomposition of the ozonide, producing 3-acyloxy-11,17-diketoetiocholane (IX) and 3-acyloxy-11-keto-17-formyletiocholane (X). Compound (X) is oxidized to 3-acyloxy-11-ketoetiocholanic acid (XI) which is separated from compound (IX) by extraction with alkali.

Compound (IX) is hydrolyzed to form 3-hydroxy-11,17-diketoetiochlolane (XII) which is treated with acetylene to form 3,17-dihydroxy-11-keto-pregnine-20 (XIII). This compound (XIII) is catalytically hydrogenated to produce $\Delta^{20,21}$-3,17-dihydroxy-11-ketopregnene (XIV) which is acylated to form $\Delta^{20,21}$-3-acyloxy-17-hydroxy-11-ketopregnene (XV), and this compound is halogenated to produce $\Delta^{17,20}$-3-acyloxy-11-keto-21-halopregnene (XVI). When treated with an alkali metal salt or alkaline earth metal salt of an organic acid, this compound yields $\Delta^{17,20}$-3,21-diacyloxy-11-ketopregnene (XVII) which is hydrolyzed producing $\Delta^{17,20}$-3,21-dihydroxy-11-ketopregnene (XVIII). The latter product (XVIII) is partially esterified and the mono ester (XIX) thus produced is oxidized to convert the unesterified hydroxy group in the 3 position to a keto group, thereby yielding the ester of $\Delta^{17,20}$-3,11-diketo-21-acyloxy-pregnene (XX). This product (XX) is hydrolyzed and the $\Delta^{17,20}$-3,11-diketo-21-hydroxypregnene (XXI), thus formed is acylated producing $\Delta^{17,20}$-3,11-diketo-21-acyloxypregnene (XXII). Hydroxylation at the unsaturation of the last mentioned compound (XXII) results in the production of 3,11-diketo-17($\beta$),20,21-trihydroxypregnene (XXIII) which is then acylated to form 3,11-diketo-17($\beta$)-hydroxy-20,21-diacyloxypregnene (XXIV). When brominated, this compound yields 3,11-diketo-4-bromo-17($\beta$)-hydroxy-20,21-diacyloxypregnene (XXV).

This compound is then treated with a reagent capable of removing the elements of hydrogen bromide, thereby producing $\Delta^{4,5}$-3,11-diketo-17($\beta$)-hydroxy-20,21-diacyloxypregnene (XXVI) which on hydrolysis forms $\Delta^{4,5}$-3,11-diketo-17($\beta$), 20,21-trihydroxypregnene (XXVII). Partial acylation of this compound (XXVII) gives $\Delta^{4,5}$-3,11-diketo-17($\beta$),20-dihydroxy-21-acyloxy-pregnene (XXVIII) which, when oxidized, yields a mixture of $\Delta^{4,5}$-3,11,20-triketo-17($\beta$)-hydroxy-21-acyloxypregnene (XXIX) and $\Delta^{4,5}$-3,11,17-triketo androstene (XXX). Compounds (XXIX) and (XXX) may be separated by conventional operations, for example chromatography, and compound (XXIX) hydrolyzed to produce the desired adrenal hormone, $\Delta^{4,5}$-3,11,20-triketo-17($\beta$),21-dihydroxypregnene.

This invention is concerned with compounds of the type represented by intermediate 25 above and also with processes of producing same, together with certain related compounds such as intermediates 26 and 27. Intermediate 25 may be represented by the formula:

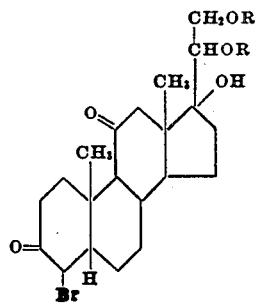

in which R is acyl.

The starting material employed in the process according to this invention, 3,11-diketo-17-hydroxy-20,21-diacyloxypregnane, may be obtained as described in copending application Serial No. 649,766, filed February 23, 1946.

In accordance with this invention, the compound 3,11-diketo-17-hydroxy-20,21-diacycloxypregnane is reacted with an equimolecular quantity of bromine in an inert solvent such as glacial acetic acid, the bromine entering molecule at the 4 position to form 4-bromo-3,11-diketo-17-hydroxy-20,21-diacyloxypregnane. It is important not to use more than an equimolecular quantity of bromine because the use of an excess favors the formation of the dibromide. This product is treated thereafter, for example by refluxing, with a tertiary amine, e. g. pyridine, causing the formation of a double bond in the desired 4-5 position, thus yielding $\Delta^{4,5}$-3,11-diketo-17-hydroxy-20,21-diacyloxypregnene, having the structural formula:

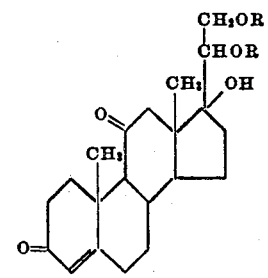

R being acyl. Upon hydrolysis of this last-mentioned product, $\Delta^{4,5}$-3,11-diketo-17,20,21-trihydroxy-pregnene is obtained, having the structural formula:

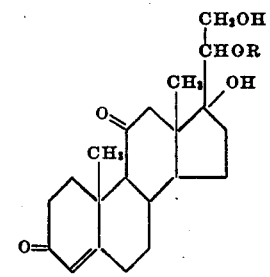

This compound is considered to be one of the substances which occur naturally in the adrenal cortex.

The acyl group "R" in the above formulae may be any desired group derived, for example, from acetic, propionic, butyric, valeric, caproic, capric, etc., benzoic, toluic, or phenylacetic acid, of which the lower aliphatic acids, i. e. those having 6 carbon atoms or less, are preferred.

Preferably, the 3,11-diketo-17-hydroxy-20,21-diacyloxypregnane is reacted with bromine in an inert solvent such as glacial acetic acid, following which the product is isolated by taking the reaction mixture up in a solvent such as ether, washing with dilute alkali solution or alkali metal carbonate solution for the removal of acids, evaporating to dryness in vacuo, and crystallizing the residue from ether. The 4-bromopregnane thus produced may be treated with a tertiary amine such as pyridine and converted to $\Delta^{4,5}$-3,11-diketo-17-hydroxy-20,21-diacycloxypregnene, which upon hydrolysis is converted to $\Delta^{4,5}$-3,11-diketo-17-20,21-trihydroxypregnene.

The following example is illustrative of the practice of this invention, however it will be understood the example is solely for purposes of illustration and that the invention is not limited thereto.

*Example*

To a solution of 126 mg. of 3,11-diketo-17 ($\beta$)-hydroxy-20,21-diacetoxypregnane in .5 cc. of glacial acetic acid was added a solution of 42.3 mg. of bromine in .5 cc. of glacial acetic acid. After a few minutes decoloration ensued, the mixture was taken up in ether, washed with dilute sodium bicarbonate and water, concentrated in vacuo, and crystallized from a small volume of ether. The 4-bromo-3,11-diketo-17 ($\beta$)-hydroxy-20,21-diacetoxypregnane so obtained in about 90% yield had a melting point of 188°–189° C. Other compounds of this type having acyl groups different from acetyl react with bromine under these conditions to yield analogous products.

A solution of 124 mg. of the 4-bromo compound was refluxed in 15 cc. of pyridine for 10 hours, cooled, concentrated in vacuo, diluted with water, and extracted with chloroform. The chloroform layer was washed with dilute hydrochloric acid, then with water, and concentrated to dryness in vacuo. The residue was dissolved in a small volume of benzene and introduced into a column containing 3 grams neutral alumina previously activated at 150° C. The elution from this column of the desired compound was carried out by addition thereto of 15 cc. portions of solvents beginning with absolute ether, proceeding through ether-chloroform mixtures with an increasing proportion of chloroform, through pure chloroform, then through chloroform-acetone mixtures, and finally with methanol. The 21-monoacetate was contained in the fractions from 4:1 chloroform : ether to 1:1 chloroform : acetone. The product so obtained, $\Delta^{4,5}$-3,11-diketo-17 ($\beta$)-hydroxy-20,21-diacetoxypregnene, on crystallization from methanol had a melting point of 252°–253.5° C. $(\alpha)_D +179°$. A practically 40% yield was thus obtained.

To a solution of 360 mg. of $\Delta^{4,5}$-3,11-diketo-17 ($\beta$)-hydroxy-20,21-diacetoxypregnene in 20 cc. of methanol was added a solution of 150 mg. of potassium carbonate and 250 mg. of potassium bicarbonate in 5 cc. of water. The mixture was permitted to stand at room temperature overnight, was concentrated in vacuo, and extracted with chloroform. The chloroform solution was washed with water, concentrated in vacuo, and the residue crystallized from acetone. The $\Delta^{4,5}$-3,11-diketo-17 ($\beta$)-20,21-trihydroxypregnene so obtained in about 95% yield had a melting point of 208.5°–209.5° $(\alpha)_D +140°$.

The temperatures mentioned in the example are room temperatures unless otherwise indicated. The temperatures, however, are not critical and the reactions may be carried out at higher or lower temperatures; but extremely high temperatures should be avoided because of the likelihood of decomposition of the desired products which may result from operation at such temperatures.

Unless otherwise stated, the reagents can be used in different proportions than are indicated in the above example as the proportions unless otherwise indicated are not critical, although enough of the reagents should be employed to insure substantially complete reaction to produce the desired products.

The specific rotations for $\Delta^{4,5}$-3,11-diketo-17 ($\beta$)-hydroxy-20,21-diacetoxypregnene and $\Delta^{4,5}$-3,11-diketo-17 ($\beta$), 20,21-trihydroxypregnene indicated above by the symbol $[\alpha]_D$, were determined in acetone solution using the D line of sodium.

Various changes and modifications might be made in my invention as defined herein without departing from the scope thereof. It is my intention that these changes and modifications, to the extent that they are comprehended within the scope of the appended claims, shall be considered as part of my invention.

What is claimed is:

3,11-diketo-4-bromo-17 ($\beta$)-hydroxy-20,21-diacetoxypregnane.

LEWIS H. SARETT.

REFERENCES CITED

The following references are of record in the file of this patent:

UNITED STATES PATENTS

| Number | Name | Date |
| --- | --- | --- |
| 2,153,700 | Serini | Apr. 11, 1939 |
| 2,256,500 | Serini | Sept. 23, 1941 |
| 2,345,711 | Marker | Apr. 4, 1944 |